United States Patent [19]

Skinner

[11] Patent Number: 5,741,015

[45] Date of Patent: Apr. 21, 1998

[54] PIPE TO MANHOLE SEAL

[76] Inventor: William O. Skinner, 5520 S. Bend Dr., Fort Wayne, Ind. 46804

[21] Appl. No.: 664,841

[22] Filed: Jun. 17, 1996

[51] Int. Cl.$^6$ ............................................. F16J 9/00
[52] U.S. Cl. ........................... 277/9.5; 277/11; 277/152; 285/23
[58] Field of Search ........................ 277/9, 9.5, 11; 285/18, 23, 37

[56] References Cited

U.S. PATENT DOCUMENTS

| | | | |
|---|---|---|---|
| 3,515,798 | 6/1970 | Sievert | 174/135 |
| 3,529,836 | 9/1970 | Hyde | |
| 3,759,280 | 9/1973 | Swanson | |
| 4,103,901 | 8/1978 | Ditcher | |
| 4,159,829 | 7/1979 | Ditcher | |
| 4,389,440 | 6/1983 | Keith | 428/36 |
| 4,503,105 | 3/1985 | Tomioka | 428/36 |
| 4,625,976 | 12/1986 | Gilbert | |
| 4,805,920 | 2/1989 | Gavin | 277/9 |
| 5,087,492 | 2/1992 | Vallauri et al. | 428/34.9 |
| 5,529,312 | 6/1996 | Skinner et al. | 277/189 |
| 5,560,969 | 10/1996 | Portas | 285/18 |

*Primary Examiner*—Daniel G. DePumpo
*Attorney, Agent, or Firm*—John R. Benefiel

[57] ABSTRACT

A sealing assembly and method in which an elastomeric sealing sleeve is stretched over a strippable core, one end of the sleeve sealed to a hole in manhole structure either by casting in or by an expandable clamp. A pipe is inserted in the core and the core stripped out by tearing along a helical preweakening to allow the other end of the sleeve to constrict onto the pipe.

8 Claims, 4 Drawing Sheets

PIPE TO MANHOLE SEAL

BACKGROUND OF THE INVENTION

This invention concerns sealing arrangements used in connections between a pipe and a manhole structure in sewer system installations.

Such sealing arrangements have included cast-in seals in which an elastomeric seal has annular portions embedded in the concrete forming the manhole structure at the time the manhole is cast with an inwardly projecting portion of the seal engaging a pipe inserted into an opening formed in the manhole structure. See U.S. Pat. No. 4,350,351, issued on Sep. 21, 1982 for a "Manhole Joint Gasket Assembly and Joint Formed Therewith" and U.S. Pat. No. 3,973,783, issued on Aug. 10, 1976 for a "Pipe Joint Sealing Device" for examples of such sealing arrangements.

A second approach to providing a seal or gasket for such applications is the use of a radially expandable locking sleeve device positioned within one end of a sealing sleeve, the locking sleeve expanded to press one section of the sleeve against a preformed or cut hole in the manhole structure to establish a seal. The pipe is received within the other end of the sleeve and clamped to be sealed within the sleeve. See U.S. Pat. No. 5,150,927, issued on Sep. 29, 1992 for an "Expandable Seal Arrangement" and U.S. Pat. No. 4,478,437, issued on Oct. 23, 1984 for a "Radially Expandable Locking Sleeve Device" for examples of such sealing arrangement.

Another approach is described in U.S. Pat. No. 3,759,280, issued on Sep. 18, 1973 for a "Pipe to Manhole Seal" in which a seal sleeve is clamped by means of a clamping disc bolted against a face of the manhole structure securing and sealing the radial face of the sleeve against the radial face of the manhole structure with the sleeve then being clamped to the pipe inserted in an opening in the manhole structure.

The need to adapt such sealing arrangements to various pipe sizes requires a number of sealing sleeves to be provided which is disadvantageous since requiring inventory of large numbers of different sizes of sealing gaskets.

In the case of cast-in seals, the manhole opening cannot be adapted to pipes of different sizes increasing the difficulty of manufacturing such manhole structures and offering less flexibility in usage of existing manhole structures which cannot easily be adapted to differing pipe sizes.

Accordingly, it is an object of the present invention to provide a sealing arrangement particularly adapted to sealing pipe to manhole joints in which a single configuration of seal is readily adaptable to various pipe sizes which will simplify stocking of sealing sleeves and also allow adaptation of an existing manhole structure to various pipe sizes.

SUMMARY OF THE INVENTION

These and other objects, which will become apparent upon a reading of the following specification and claims, are achieved by the use of an elastomeric sealing sleeve which is stretched over a strippable sleeve core such as to be expanded to a size larger than a range of sizes of pipes which are able to be inserted within the strippable sleeve core preparatory to making a pipe sealing connection.

The sealing sleeve can be of a cast-in type in which case the strippable sleeve core is positioned within the forms for the manhole structure with a locking feature at one end of the sleeve positioned to be cast within the concrete of the manhole structure. At installation, the pipe is placed within the strippable sleeve core and the core then removed by pulling a strip to tear free the helical turns comprising the sleeve structure and the separated strip pulled out through the clearance space between the pipe and the expanded sleeve.

After removal of the strippable sleeve core, the elastomeric sealing sleeve relaxes to constrict over the pipe O. D. and a sealing clamp installed to clamp and seal the elastomeric sleeve other end to the pipe to complete the installation of the sealing sleeve.

In a second version, a sealing sleeve may be stretched over a strippable sleeve core and also over a radially expandable clamp device at one end of the sealing sleeve. The one end of the sealing sleeve is positioned within an existing opening in the manhole structure and the radially expandable device operated to establish a seal connection to the inside wall of the existing bore in the manhole structure.

The pipe is then inserted within the strippable sleeve core and the strippable sleeve core removed by pulling on the helical strip making up the strippable sleeve core and allowing the other end of the elastomeric sleeve to relax and constrict around the outside diameter of the pipe. Installation of an external clamp completes the installation.

The stretched condition of the sealing sleeve maintained by the strippable core allows the sleeve to accommodate a range of pipe sizes, such that a single sealing assembly can be utilized for a number of pipe sizes.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
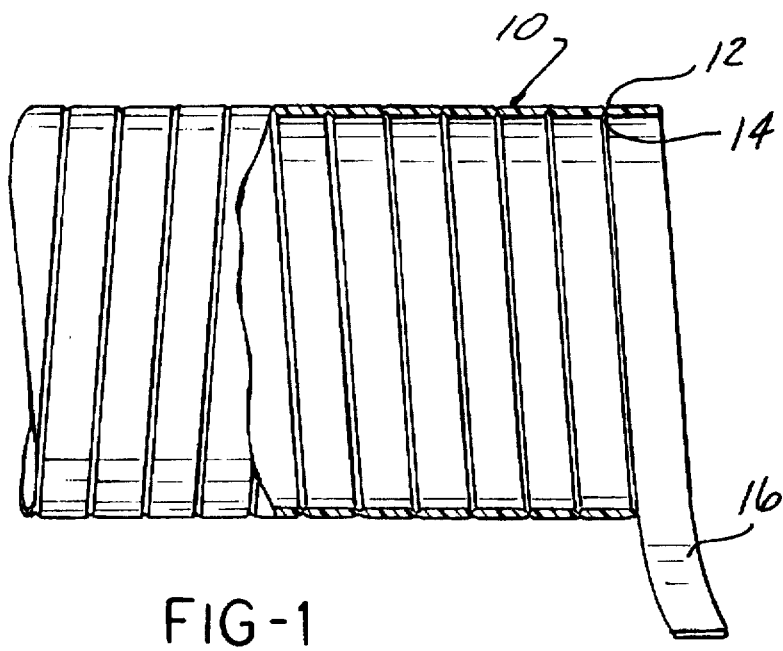
FIG. 1 is a fragmentary partially sectional view of a strippable sleeve core member used in the sealing arrangement according to the present invention.

Referring to the drawings, FIG. 1 illustrates a strippable sleeve core which is used with the seal assembly according to the present invention. The strippable core sleeve 10 is comprised of a generally cylindrical hollow cylinder formed of plastic material of fairly rigid characteristics capable of supporting a thick elastomeric seal sleeve stretched thereover so as to be expanded several inches over the relaxed diameter thereof.

The sleeve has a helical groove on the outside 12 and inside 14 which allows the sleeve to be conveniently removed by tearing the core sleeve into a strip 16 of a width corresponding to the pitch of the helical grooves 12 and 14.

Such sleeves have heretofore been employed in various fields including for use with electrical connectors.

Figures 2, 2A:
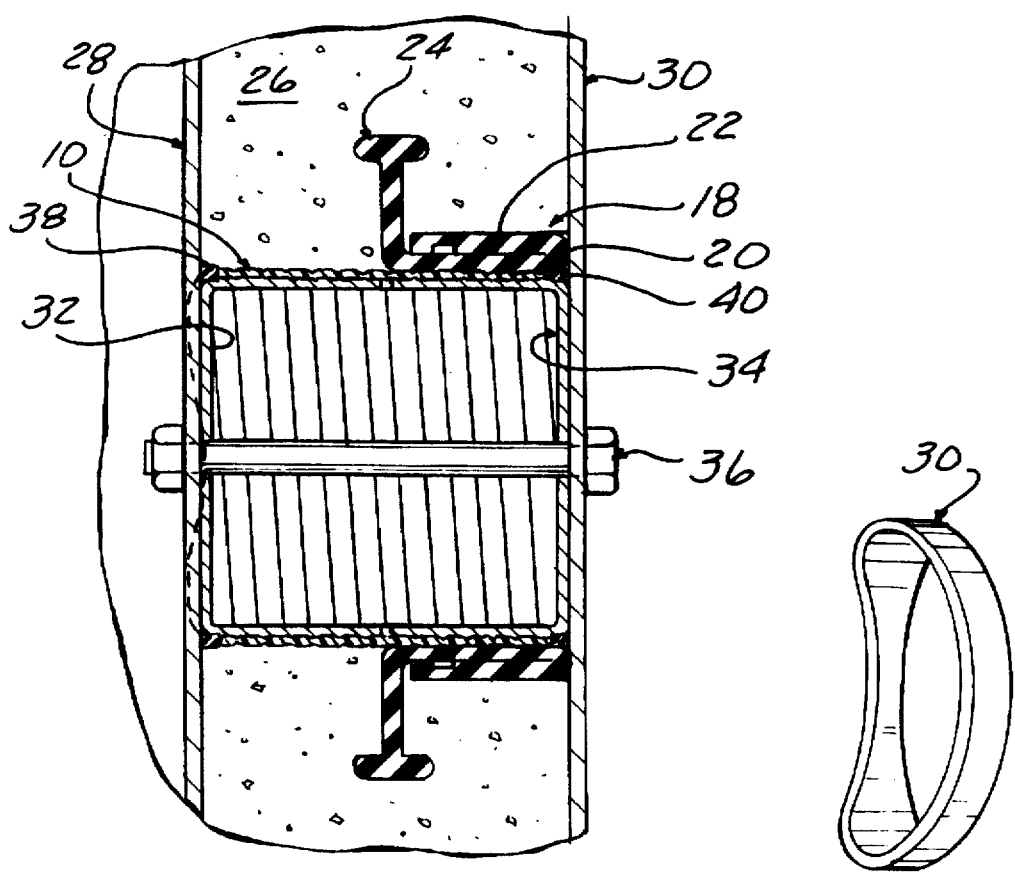
FIG. 2 is a fragmentary sectional view taken through a manhole casting form and showing a sealing assembly according to the present invention mounted within the forms with concrete cast about the sealing assembly.
FIG. 2A is a perspective view of a sealing gasket used with the strippable core.

FIG. 2 illustrates the seal assembly according to the present invention with a first embodiment designed to be partially cast in place within a manhole structure.

The seal assembly 18 includes a strippable sleeve core 10 shown in FIG. 1 and an elastomeric sleeve seal 20 which is installed stretched over the strippable sleeve core 10 so as to be held in a position several inches larger in diameter than the relaxed diameter.

The elastomeric sleeve seal 20 has an end portion 22 which is folded back over such as to not extend beyond the one end of the strippable sleeve core 10 as shown in FIG. 2.

A radially extending portion 24 has an enlarged end adapted to be captured within a mass of concrete 26 forming the manhole structure. The sleeve assembly is located within inner and outer casting forms 28 and 30 held in a particular location between the forms 28 and 30 by means of a pair of locator cylinders 32 and 34 secured with a bolt assembly 36. Due to the curvature of the forms 28 and 30 which form the cylindrical shape of the manhole structure, a pair of saddle-shaped gaskets 38 and 40 (see FIG. 2A) are provided on either end of the sleeve core 10 in order to insure that there are no gaps existing between the inside of the forms 28 and 30 past which the concrete can bleed through.

Figure 3:
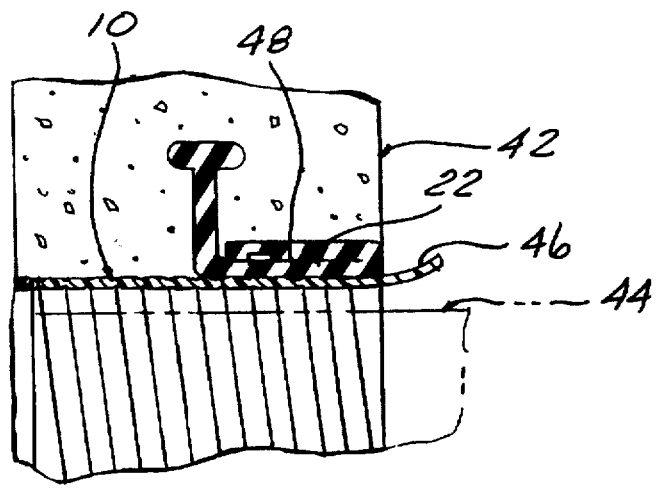
FIG. 3 is a fragmentary partially sectional view taken through a manhole structure and the sealing assembly according to the present invention after the forms have been removed.

After the concrete forms 28 and 30 are removed and the locator pieces 32 and 34 are extracted, the manhole structure 42 is formed with a through diameter opening corresponding to the shape of the seal assembly 18. A pipe 44 to be installed is inserted into the opening as indicated in phantom in FIG. 3.

Figure 4:
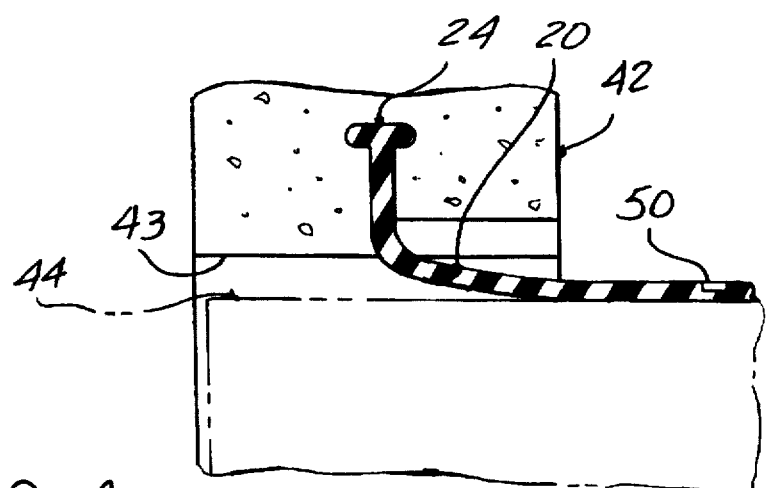
FIG. 4 is a fragmentary partially sectional view taken through the manhole structure and sealing assembly depicting the pipe in phantom and positioned within the manhole opening with the strippable seal removed and the seal in position on the outside diameter of the pipe.

A strip 46 is pulled free from the strippable sleeve core 10 and the sleeve core 10 is removed by tearing the strip along the helical groove pattern and pulled out of the clearance space. This allows the folded section 22 and the underlying section 48 of sealing sleeve 20 to contract in relaxing from the stretched condition formerly maintained by the strippable sleeve core 10. The section 22 is folded out over the outside diameter of the pipe 44 as shown in FIG. 4 and a suitable clamp 50 installed on the projecting end. A molded groove is provided for this purpose on the outside of the end section 22 of the sleeve 20.

Figure 5:
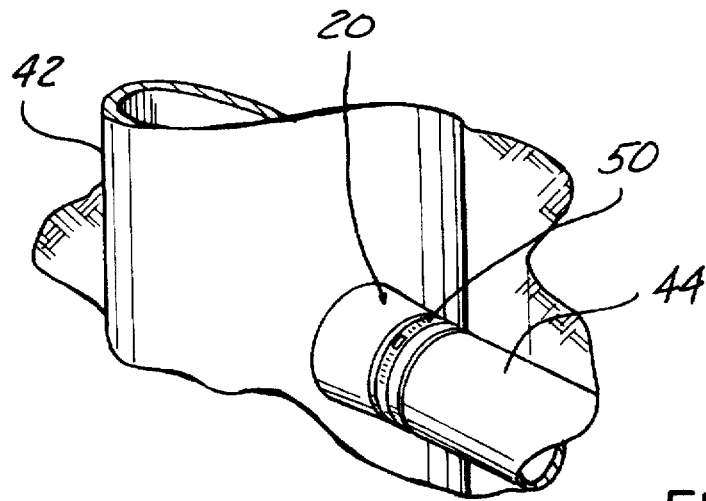
FIG. 5 is a fragmentary perspective view of the manhole pipe and sealing connection completed therebetween.
Figure 6:
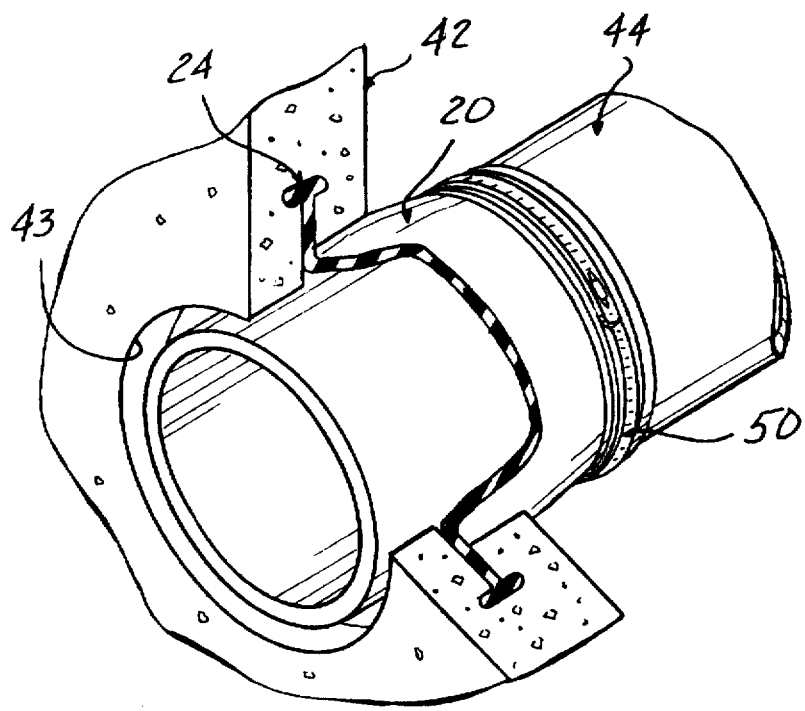
FIG. 6 is an enlarged fragmentary partially sectional view of the sealing connection shown in FIGS. 4 and 5.

As can be seen in FIGS. 4, 5, and 6, the sleeve 20 assumes a tapering shape transitioning from the hole wall 43 in the manhole structure 42 down to the outside diameter of the pipe 44.

A range of pipe sizes can be accommodated as the elastomeric seal sleeve 20 can be stretched by several inches in diameter and constrict down within that range of stretch.

Figure 7:
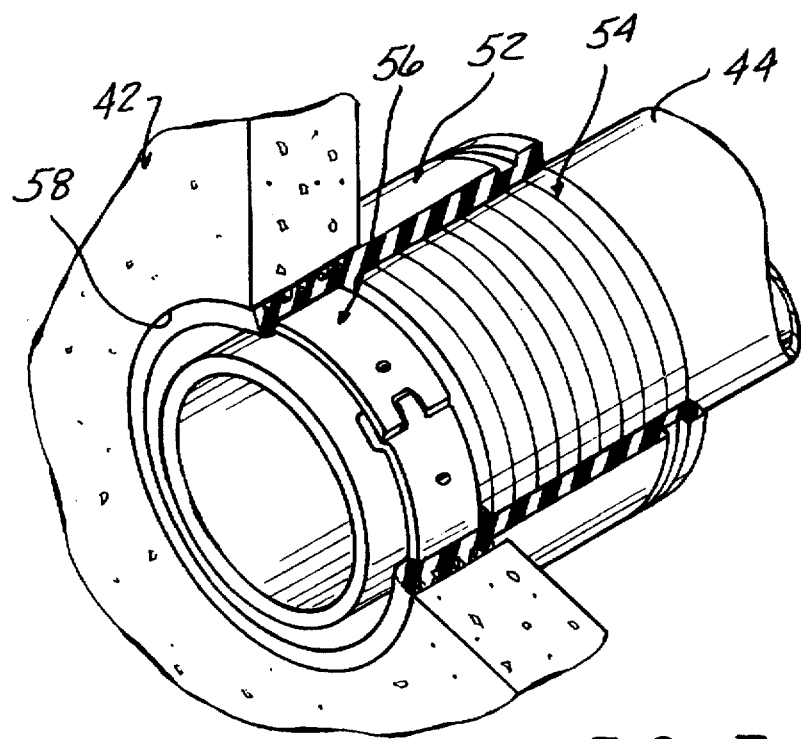
FIG. 7 is a perspective fragmentary and partially sectional view of a manhole structure showing a sealing arrangement according to the present invention installed in an opening in the manhole structure and a pipe positioned within the sealing assembly preparatory to making the pipe-to-manhole sealing connection.
Figure 8:
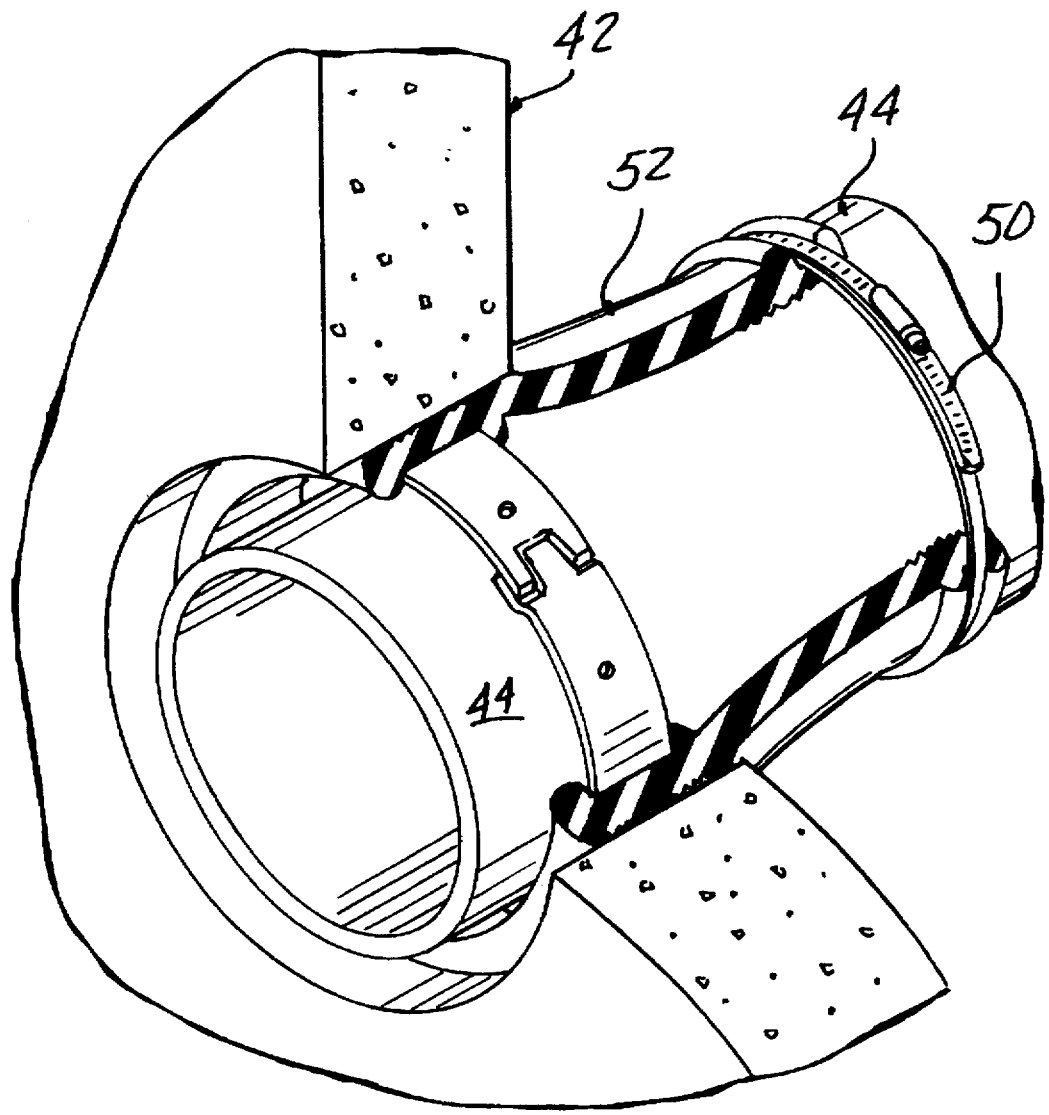
FIG. 8 is a perspective view of the completed sealing connection using the sealing assembly according to the embodiment shown in FIG. 7.

FIGS. 7 and 8 show an alternative embodiment in which an elastomeric sealing sleeve 52 has a segment of its length stretched over a strippable sleeve core 54 so as to be enlarged by several inches over its relaxed diameter.

Another segment of this length has an expandable clamp 56 secured within a corresponding groove on the inside diameter of the sleeve 52. This clamp 56 and one end of the sleeve 52 are placed within an opening 58 which may be preformed or cut into the manhole structure 42.

The clamp 56 is expanded to create a sealing engagement one end of sleeve 52 with the inside of the hole 58. The clamp 56 is described in detail in U.S. Pat. No. 4,478,437 and hence will not be here further described.

The pipe 44 is positioned within the inside of the strippable sleeve core 54 as in the previously described embodiment and after removal of the sleeve 54, the elastomeric sealing sleeve 52 relaxes to constrict onto the outside diameter of the pipe 44 as shown in FIG. 8 with a clamp 60 then applied to create a secure sealing engagement with the pipe 44.

Accordingly, a standard sealing assembly of each type may be provided for a range of pipe sizes within the stretched range of expansion of the sleeve 52 such as to accomplish the above-recited object of the present invention.

I claim:

1. In combination, a seal arrangement and a perimeter wall of an opening in a structure, said combination enabling a sealed connection to be made with any of a range of sizes of pipes installed in said opening, said combination comprising:

a hollow cylindrical strippable sleeve core having a preweakening pattern formed therein allowing said sleeve core to be stripped by tearing along said preweakening pattern and collapsing said sleeve core;

an elastomeric sleeve having one segment stretched over said sleeve core;

said elastomeric sleeve having another segment axially offset from said one segment; and, one end of said elastomeric sleeve another segment formed with a large headed feature extending annularly outward thereof lying radially outward from said one segment, said one end cast into a surrounding cast structure defining said opening perimeter wall.

2. The combination according to claim 1 wherein said sleeve core comprises a plastic hollow cylinder.

3. The combination according to claim 2 wherein said preweakening pattern comprises helical grooving in said sleeve enabling tearing apart of said sleeve by pulling of a strip portion from one end thereof.

4. A method of establishing a sealed connection between the inside diameter of a hole in a structure and the smaller outside diameter of a pipe inserted into said hole, said method comprising the steps of:

preweakening a hollow sleeve core having an inside diameter larger than said pipe outside diameter, said preweakening of said sleeve core carried out along a pattern to enable said sleeve core to be pulled apart by tearing along said preweakening pattern to collapse said sleeve core;

stretching one segment of an elastomeric sealing sleeve of a relaxed diameter smaller than said outside diameter of said pipe over said hollow strippable sleeve core;

securing another segment of said elastomeric sleeve to said inside diameter of said hole in said structure so as to be sealed thereto;

inserting a pipe into said sleeve core so as to also lie within said stretched one segment of said elastomeric sealing sleeve;

removing said sleeve core by tearing said sleeve core along said preweakening pattern to collapse said sleeve core and allow removal thereof to cause said one segment of said elastomeric sleeve to constrict onto the outside diameter of said pipe; and, clamping said constricted one segment of said elastomeric sleeve to said pipe.

5. The method according to claim 4 wherein said preweakening step comprises the step of forming a helical groove into said sleeve core.

6. The method according to claim 4 wherein said step of securing said another segment of said elastomeric sleeve to said inner diameter of said hole in said structure comprises the step of casting said another segment into said structure defining said inside diameter of said hole.

7. The method according to claim 4 wherein said step of securing said another segment of said sleeve to said inside diameter of said hole in said structure comprises the step of internally expanding said another segment so as to force said another segment of said elastomeric sleeve outwardly and against said inside diameter of said hole.

8. In combination, a seal arrangement and a perimeter wall of an opening in a structure, said combination enabling a sealed connection to be made with any of a range of sizes of pipes installed in said opening, said combination comprising:

a hollow cylindrical strippable sleeve core having a preweakening pattern formed therein allowing said sleeve core to be stripped by tearing along said preweakening pattern and collapsing said sleeve core;

an elastomeric sleeve having one segment stretched over said sleeve core;

said elastomeric sleeve having another segment axially offset from said one segment; and, one end of said elastomeric sleeve another segment formed with a large headed feature extending annularly outward thereof lying radially outward from said one segment, said one end cast into a surrounding cast structure defining said opening perimeter wall;

a radially expandable clamp positioned within said offset segment of said elastomeric sleeve adjacent said strippable sleeve core and securing said offset segment to said wall perimeter.

* * * * *